United States Patent [19]
Endo et al.

[11] 3,755,652
[45] Aug. 28, 1973

[54] CODE READING METHOD AND APPARATUS

[75] Inventors: Takashi Endo, Tarumi-ku, Kobe; Hironobu Yamamoto, Suma-ku, Kobe; Yasuhiko Nohara, Kohoku, Yokohama, all of Japan

[73] Assignees: Mitsubishi Jukogyo Kabushiki Kaisha; Nihon Doro Kodan, both of Tokyo, Japan

[22] Filed: Nov. 8, 1971

[21] Appl. No.: 196,734

Related U.S. Application Data

[63] Continuation of Ser. No. 845,799, July 29, 1969, abandoned.

[30] Foreign Application Priority Data

Aug. 8, 1968 Japan ............................ 43/55984

[52] U.S. Cl...... 235/61.11 D, 198/4 F, 235/61.12 M
[51] Int. Cl. ............................................ G06k 7/08
[58] Field of Search ............. 235/61.12 M, 61.11 D; 178/6.6 A, 6.6 DD; 340/174.1 A, 174 JA, 347 P; 179/100.2 A, 100.2 C; 194/4 F

[56] References Cited

UNITED STATES PATENTS

| | | | |
|---|---|---|---|
| 3,460,118 | 8/1969 | Woolfolk | 179/100.2 C |
| 2,952,008 | 9/1960 | Mitchell et al | 235/61.12 |
| 3,171,020 | 2/1965 | Lord | 235/61.12 |
| 3,156,906 | 11/1964 | Cummins | 340/174.1 C |

*Primary Examiner*—Maynard R. Wilbur
*Attorney*—John J. McGlew et al.

[57] ABSTRACT

In a code read-out method and apparatus, a code carrier is in the form of a circular plate of non-magnetic material having, on one surface, clock indicia in the form of concentric, uniformly spaced annular bands of magnetic material and having, on the opposite surface, signal indicia in the form of concentric, selectively spaced annular bands of magnetic material, each opposite a different respective clock indicia. The code carrier is passed along a detection path and between a pair of magnetic pick-up heads which are disposed directly opposite each other, and each of which is associated with a different respective surface of the plate. Both heads are connected in parallel to an AND circuit and to an OR circuit. The OR circuit provides an output pulse responsive to detection of an indicia on either surface of the plate. The AND circuit provides an output pulse responsive only to simultaneous detection of indicia on both surfaces of the plate. Thereby, the output clock pulses are readily discriminated from the output signal pulses. Preferably, the magnetic material is imbedded in annular channels in the plate surfaces.

9 Claims, 6 Drawing Figures

INVENTORS
TAKASHI ENDO
HIRONOBU YAMAMOTO
YASUHIKO NOHARA

BY McGlew and Toren
ATTORNEYS

INVENTORS
TAKASHI ENDO
HIRONOBU YAMAMOTO
YASUHIKO NOHARA

BY McGlew and Toren
ATTORNEYS

CODE READING METHOD AND APPARATUS

This application is a continuation of application Ser. No. 845,799, filed July 29, 1969, and now abandoned.

BACKGROUND OF THE INVENTION

In a conventional code reading method, a ray of radiant energy is directed upon one of the surfaces of a code plate of non-metallic material, such as plastic, having metallic material imbedded therein. A radiant ray, passing through a metallic ring, is detected on the opposite surface of the plate. The variation in the detected radiant energy, resulting from the radiant energy passing through the code plate, is converted into a pulse signal so that the code on the code plate can be read.

In a method of this type, as a radiant material is used for reading the code, the operator must have a license to handle radiant material, and locations for operation available to the operator are limited. Furthermore, since the signal code inherent to the respective code plate, and the clock code performing the timing function, are coexistent in the detected radiant energy passing through the code plate, it is necessary to discriminate between the two codes. Practically, however, the sensitivities of the receiving element, amplifier and level setter, or the like, adversely affect the discriminating operation and cause errors. As a result, frequently code reading cannot be carried out properly.

SUMMARY OF THE INVENTION

This invention relates to code reading and, more particularly, to an novel and improved method of and apparatus for code reading in which a signal code and a clock code are readily discriminated and the hazards inherent in the use of radiant energy are avoided.

In accordance with the invention, the signal code bands and the timing code bands of the code plate are constituted by a magnetic material, and these code bands are magnetically detected, thereby facilitating the code reading operation. The code bands are disposed on both surfaces of the code plate, the code bands on one surface of the plate constituting clock or timing indicia and the code bands on the opposite surface of the plate constituting the signal indicia. The clock or timing indicia are uniformly spaced from each other, and the signal indicia are selectively spaced, with each signal indicia being aligned with a different respective clock or timing indicia.

The code plate is passed along a detection path and, at a point on this path, a pair of magnetic pick-up heads are arranged opposite each other, each being operable to scan a respective different surface of the code plate. The outputs of the magnetic pick-up heads are connected in parallel to the input of an AND circuit, The AND circuit provides an output pulse only responsive to simultaneous detection of magnetic material bands on opposite surfaces of the code plate. Thereby, the signal indicia can be distinguished from the clock indicia even if the code plate is passed in inverted relation through the magnetic detection area. Even under this condition, the code can be read without being influenced by the sensitivities of the receiving element and amplifier.

The magnetic pick-up heads are also connected in parallel to an OR circuit, which provides an output pulse responsive to detection of each band of magnetic material, irrespective of the plate surface on which the detected band is located. The OR circuit will thus provide clock or timing pulses.

Preferably, the code plate is circular with the clock indicia being provided on one surface of the plate in the form of concentric, uniformly spaced annular bands of magnetic material, and the signal indicia being provided, on the other surface of the plate, in the form of concentric selectively spaced annular bands of magnetic material, each opposite a different respective clock indicia. Furthermore, it is preferred to provide the annular indicia in the form of rings of magnetic material imbedded in concentric annular channels in the surfaces of the code plate.

An object of the invention is to provide an improved code reading method and apparatus free of the disadvantages of the prior art.

Another object of the invention is to provide such a method and apparatus in which the code information is in the form of magnetic material.

A further object of the invention is to provide such a method and apparatus in which the code carrier is a circular plate of non-magnetic material having, on one surface, clock indicia in the form of concentric, uniformly spaced bands of magnetic material.

Another object of the invention is to provide such a method and apparatus in which the plate has, on its other surface, signal indicia in the form concentric, selectively spaced annular bands of magnetic material each opposite a different respective clock indicia.

A further object of the invention is to provide such a method and apparatus in which the bands of magnetic material are imbedded in concentric annular channels in the opposite surfaces of the code carrier.

Another object of the invention is to provide such a method and apparatus in which the code carrier is passed along a detection path and, at a point on said path, both surfaces of the plate are separately magnetically scanned simultaneously to detect the indicia on the plate surfaces.

Another object of the invention is to provide such a method and apparatus in which the detection is performed by a pair of magnetic pick-up heads, each associated with the respective surface of the plate.

A further object of the invention is to provide such a method and apparatus in whicb the outputs of the two magnetic pick-up heads are connected in parallel to an AND circuit and to an OR circuit.

For an understanding of the principles of the present invention, reference is made to the following description of a typical embodiment thereof as illustrated in the accompanying drawings.

DESCRIPTION OF THE PREFERRED EMBODIMENT

Figure 1:
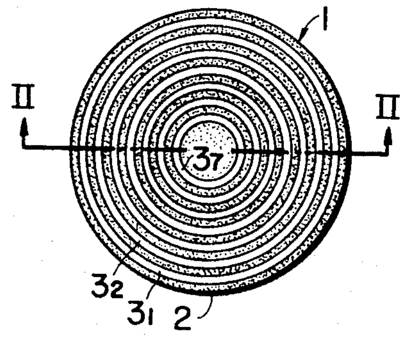
FIG. 1 is a plan view of one surface of a code plate embodying the inventions.
Figure 2:
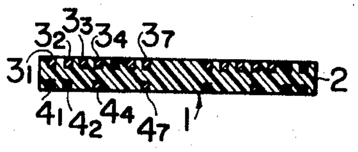
FIG. 2 is a diametric sectional view taken on the line II—II of FIG. 1.

Referring first to FIGS. 1 and 2, a code plate 1, of non-magnetic material, such as plastic composition material or synthetic resin, is formed as a circular disk having concentric annular channels in its opposite surfaces. The concentric annular channels on one surface are spaced uniformly from each other, while the concentric annular channels on the other surface are spaced selectively from each other, but with each channel aligned with a different respective channel on the one surface of the disk.

On the first surface of the disk, having the uniformly spaced concentric annular channels, magnetic material is imbedded in each channel to form concentric, uniformly spaced annular clock code bands $3_1$ through $3_7$, although a greater or lesser number of bands could be provided. On the opposite surface of disk 2, magnetic material is imbedded in selected annular channels to form signal code bands $4_1$, $4_2$, $4_4$ and $4_7$, whereby the signal code bands are in the form of concentric, selectively spaced annular bands of magnetic material each opposite a different respective clock indicia such as clock indicia $3_1$, $3_2$, $3_4$ and $3_7$.

Figure 3:
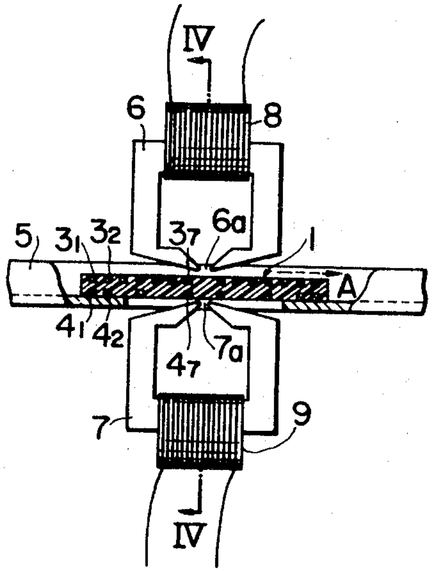
FIG. 3 is a part elevation and part sectional view illustrating the essential components of a reading arrangement for reading the code plate.
Figure 4:
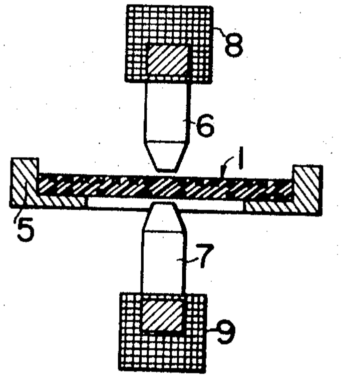
FIG. 4 is a transverse sectional view taken on the line IV—IV of FIG. 3.

Referring to FIGS. 3 and 4, for the purpose of reading the code, code plate 1 is moved along a trough-shape transport or detection path 5 which may be constituted, for example, by a suitable channel. At a detection point on path 5, at which the base of the channel may have a circular aperture, magnetic detectors 6 and 7 are disposed respectively above and below the path 5. Detectors 6 and 7 comprise magnetic cores or the like each embraced by a respective winding 8 or 9. It will be appreciated that detector 6 is operatively associated with that surface of code plate 1 carrying the clock indicia, whereas detector 7 is operatively associated with that surface of code carrier 1 carrying the signal indicia.

Figure 5:
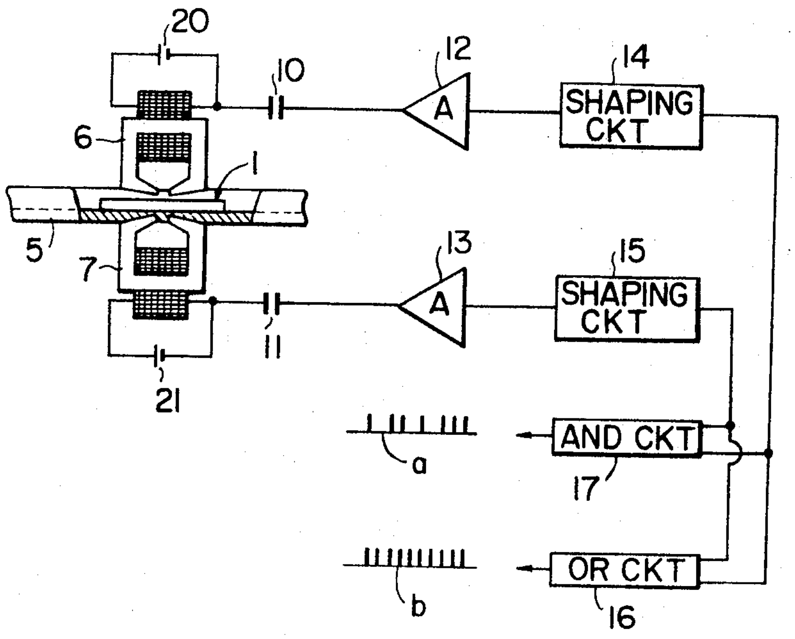
FIG. 5 is a schematic block circuit diagram of the invention apparatus.

Referring also to FIG. 5, winding 8 is connected to a source 20 of DC potential and, through a capacitor 10, to the input of an AC amplifier 12. Similarly, winding 9 is connected to a source 21 of DC potential and, through a capacitor 11, to the input of an AC amplifier 13. Electromotive forces are induced in the respective coils 8 and 9 by the magnetic variations occurring as carrier 1 is passed betwen pick-up heads 6 and 7.

Figure 6:
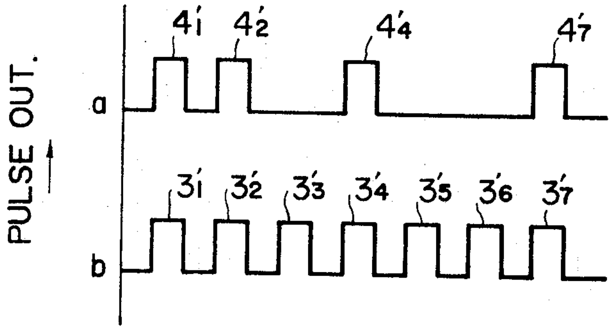
FIG. 6 is a graphical illustration of the output pulses provided by the method and apparatus of the invention.

More specifically, when code carrier 1 is moved along path 5 in the direction of arrow A at a certain definite speed, and the clock code bands $3_1$ through $3_7$ successively pass the detection part *6a* of magnetic detector 6, pulse waves are induced in winding 8 associated with detector 6. In the same manner, as signal code bands $4_1$, $4_2$, $4_4$ and $4_7$ pass detection part *7a* of detector 7, located opposite to detector 6, pulse waves are induced in winding 9 of detector 7. The output signals of coils or windings 8 and 9 are applied to the respective ampliers 12 and 13 through the respective capacitors 10 and 11, and the amplified signals are shaped by respective shaping circuits 14 and 15 into pulse waves having no distortion, as shown by the curves *a* and *b* of FIG. 6.

The output terminals of shaping circuits 14 and 15 are connected in parallel to an OR circuit 16 and to an AND circuit 17. OR circuit 16 provides an output signal upon receipt of any input signal, whether a signal appears at shaping circuit 14 or at shaping circuit 15.

On the other hand, AND circuit 17 provides an output signal only when receiving input signals simultaneously from waveform shaping circuits 14 and 15.

When code plate 1, with its clock code bands $3_1$ through $3_7$ facing upwardly, moves along path 5, as shown in FIGS. 3 and 4, a pulse wave train as shown in FIG. 6(b) appears at the shaping circuit 14, and the pulse wave train as shown at FIG. 6(a) appears at shaping circuit 15. These signals are applied to OR circuit 16 and AND circuit 17. Thus, a clock pulse train, whose waveform is the same as that of the signal shown in FIG. 6(b), appears at the output of OR circuit 16, and a signal pulse train, whose waveform is the same as that of the signal shown in FIG. 6(a), appears at the output of AND circuit 17.

Stated another way, when, for example, pulse waves $3'_1$ and $4'_1$ are applied to OR circuit 16, this circuit generates a pulse wave, and also generates a pulse wave, due to pulse $3'_3$, even when only pulse wave $3'_3$ is applied thereto in the absence of pulse wave $4'_3$. These pulse waves make up a clock pulse train whose pulse waveform is the same as that of the signal shown in FIG. 6(b).

When, for example, pulse waves $3'_1$ and $4'_1$ are applied to AND circuit 17 simultaneously, the latter generates a pulse wave. However, when only pulse wave $3'_3$ is applied, in the absence of pulse wave $4'_3$, AND circuit 17 does not generate a pulse wave train. Consequently, a signal pulse train whose waveform is the same as that of the signal shown in FIG. 6(a) is generated in AND circuit 17.

On the other hand, when noise is contained in the output signals of shaping circuits 14 and 15, no signal exists between pulse waves $3'_1$ and $3'_2$ even if a noise signal is present between pulse waves $4'_1$ and $4'_2$, and thus there is no output signal from AND circuit 17. Consequently, the desired signal pulses can be obtained without fear of deteriorating the signal due to noise.

Since the signals detected by detectors 8 and 9 are applied to AND circuit 17, the output signals of OR circuit 16 and AND circuit 17 must be the same as in the foregoing case even if code plate 1 is inverted. In other words, the clock pulses and the signal pulses can be separated from each other no matter in which posture code plate 1 moves along path 5. Furthermore, because the clock code bands $3_1$ through $3_7$ and the signal code bands $4_1$, $4_2$, – – – are separately positioned on code plate 1, separation of one code from the other can be done securely free of wrong operations, unlike a conventional radiant energy detecting method in which the two code bands are disposed as a unit on the code plate.

In accordance with the method of the invention, the dodes are read magnetically. Thus, the invention method, in comparison with that using radiant energy, has the advantage that the apparatus of the invention may be handled by those not qualified for handling radiant energy, and furthermore the apparatus is not restricted to a particular installation location.

Summarizing, the invention, as has been described, provides a code reading method using a code plate of non-magnetic material and having clock code bands and signal code bands, with the clock code bands being constituted by imbedding magnetic material in one surface of the code plate in the form of concentric, uniformly spaced annular bands, and with the signal code bands being constituted by imbedding magnetic material in the other surface of the plate in the form of concentric, selectively spaced annular rings of magnetic material each opposite a different respective clock code band. This carrier is passed through a magnetic detection area and the signals obtained from a pair of magnetic detectors, which are disposed in the detection area in opposition to each other, by detection of the magnetic bands on the code plate, are applied to an AND circuit and signal pulses are derived from the AND circuit. As the signal code bands and the clock code bands of the code carrier are formed of a magnetic material, and as the codes are detected magnetically, a much easier and safer reading operation is possible than with prior art arrangements. Furthermore, as the code bands are disposed on opposite surfaces of the code plate, and the signal pulses are derived from the AND circuit, the signal pulses and the clock pulses can be sharply discriminated from each other without causing improper operation, even if the code plate passes through the magnetic detection area in inverted position.

While a specific embodiment of the invention has been shown and described in detail to illustrate the application of the principles of the invention, it will be understood that the invention may be embodied otherwise without departing from such principles.

What is claimed is:

1. Code read-out apparatus comprising, in combination, a code carrier in the form a plate of non-magnetic material; clock indicia on one surface of said plate and in the form of uniformly spaced concentric bands of magnetic material; signal indicia on the other surface of said plate and in the form of selectively spaced concentric bands of magnetic material each opposite a different respective clock indicia; means providing a detection path for movement of said code carrier therealong; a pair of magnetic pick-up heads disposed at a point on said path in opposing relation to each other and aligned on the center locus of points generated by center of said concentric bands moving along said path, whereby each magnetic pick-up head is operable to scan across a respective opposite surface of said code carrier in any direction to detect indicia on the associated code carrier surface; and circuit means connected to both said pick-up heads and operable, responsive to simultaneous detection of indicia on both surfaces of said carrier by said pick-up heads, to provide an output pulse corresponding to the detected signal indicia.

2. Code read-out apparatus, as claimed in claim 5, in which said code carrier is circular plate of non-magnetic material; said clock indicia being in the form of concentric. uniformly spaced annular bands of magnetic material, and said signal indicia being in the form of concentric, selectively spaced annular bands of magnetic material each opposite a different respective clock indicia.

3. Code read-out apparatus, as claimed in claim 2, in which both surfaces of said plate are formed with concentric uniformly spaced annular channels; said bands of magnetic material being imbedded in said channels.

4. Code read-out apparatus, as claimed in claim 1, in which said circuit means comprises a pair of shaping circuits each having its input connected to a different respective one of said magnetic pick-up heads; and an AND circuit having its inputs each connected to a different respective one of said shaping circuits.

5. Code read-out apparatus, as claimed in claim 4, in which said circuit means includes an OR circuit having each of its inputs connected to a different respective one of said shaping circuits.

6. A code read-out method comprising the steps of providing a code carrier in the form of a plate of non-magnetic material; providing, on one surface of the plate, a number of clock indicia in the form of uniformly spaced concentric first bands of magnetic material having a permeability differing from that of the plate; providing, on the other surface of the plate, a lesser number of signal indicia in the form of selectively spaced concentric second bands of magnetic material, having a permeability differing from that of the plate, each opposite a different preselected respective first band; passing the code carrier bodily along an elongated detection path; at a point on the path and aligned on the locus of points generated by the center of said concentric bands of magnetic material moving along said path, separately and independently magnetically scanning across both surfaces of the plate simultaneously, to detect successively only the presence or absence of magnetic material bands on the respective plate surfaces by detecting the difference in permeability between the plate and the bands; responsive only to simultaneous detection of aligned first and second magnetic material bands on opposite surfaces of the plate, providing output pulses each corresponding to a detected signal indicia second magnetic material band; and, responsive to detection of either a first or second magnetic material band, providing output clock pulses.

7. Code read-out apparatus comprising, in combination, a code carrier in the form of a plate of non-magnetic material; a number of clock indicia on one surface of said plate and in the form of uniformly spaced concentric first bands of magnetic material; having a permeability differing from that of the plate; a lesser number of signal indicia on the other surface of said plate and in the form of selectively spaced concentric second bands of magnetic material, having a permeability differing from that of the plate, each opposite a different respective preselected first band; means providing an elongated detection path for movement of said code carrier bodily therealong; a pair of magnetic pick-up heads disposed at a point on said path in opposing relation to each other and aligned on the the the locus of points generated by the center of said concentric bands moving along said path, each magnetic pick-up head being operable independently to scan a respective opposite surface of said code carrier to detect successively only the presence or absence of indicia bands on the associated code carrier surface, by detecting the difference in permeability between the plate and the bands; and circuit means connected to both said pick-up heads and operable, responsive only to simultaneous detection of aligned first and second bands on respective opposite surfaces of said carrier by said pick-up heads, to provide output pulses each corresponding to a detected signal indicia second band.

8. Code read-out apparatus, as claimed in claim 7, in which both surfaces of said plate are formed with uniformly spaced channels; said bands of magnetic material being imbedded in said channels.

9. Code read-out apparatus comprising, in combination, a code carrier in the form of a circular plate of non-magnetic material; a number of clock indicia on one surface of said plate and in the form of uniformly spaced concentric first annular bands of magnetic material having a permeability differing from that of the plate; a lesser number of signal indicia on the other surface of said plate and in the form of selectively spaced concentric second annular bands of magnetic material, having a permeability differing from that of the plate, each opposite a different respective preselected first annular band; means providing an elongated detection path for movement of said code carrier bodily therealong; a pair of magnetic pick-up heads disposed at a point on said path in opposing relation to each other and aligned on the the the locus of points generated by the center of said concentric bands moving along said path, each magnetic pick-up head being operable independently to scan a respective opposite surface of said code carrier to detect successively only the presence or absence of indicia bands on the associated code carrier surface, by detecting the difference in permeability between the plate and the bands; a pair one shaping circuits each having its input connected to a different respective ne of said magnetic pick-up heads; an AND circuit having its inputs each connected to a different respective one of said shaping circuits to provide, responsive only to simultaneous detection of aligned first and second bands on respective opposite surfaces of said carrier by said pick-up heads, to provide output pulses each corresponding to a detected signal indicia second band; and an OR circuit having each of its inputs connected to a different respective one of said shaping circuits and providing output clock pulses responsive to detection of either a first or second band by said pick-up heads.

* * * * *